United States Patent
Srikanta et al.

(10) Patent No.: US 11,989,586 B1
(45) Date of Patent: May 21, 2024

(54) SCALING UP COMPUTING RESOURCE ALLOCATIONS FOR EXECUTION OF CONTAINERIZED APPLICATIONS

(71) Applicant: Amazon Technologies, Inc., Seattle, WA (US)

(72) Inventors: Archana Srikanta, Bellevue, WA (US); Onur Filiz, Redmond, WA (US); Prashant Prahlad, Seattle, WA (US); Amit Gupta, Bellevue, WA (US); Song Hu, Sammamish, WA (US)

(*) Notice: Subject to any disclaimer, the term of this patent is extended or adjusted under 35 U.S.C. 154(b) by 117 days.

(21) Appl. No.: 17/305,143

(22) Filed: Jun. 30, 2021

(51) Int. Cl.
*G06F 9/48* (2006.01)
*G06F 8/60* (2018.01)
(Continued)

(52) U.S. Cl.
CPC ............ *G06F 9/5005* (2013.01); *G06F 8/60* (2013.01); *G06F 9/455* (2013.01); *G06F 9/45558* (2013.01); *G06F 9/48* (2013.01); *G06F 9/4806* (2013.01); *G06F 9/4843* (2013.01); *G06F 9/485* (2013.01); *G06F 9/4881* (2013.01); *G06F 9/50* (2013.01); *G06F 9/5011* (2013.01); *G06F 9/5022* (2013.01); *G06F 9/5027* (2013.01); *G06F 9/505* (2013.01); *G06F 9/5061* (2013.01); *G06F 9/5072* (2013.01); *G06F 9/5077* (2013.01); *G06F 9/5083* (2013.01); *H04L 67/02* (2013.01); *H04L 67/30* (2013.01)

(58) Field of Classification Search
CPC ........ G06F 9/455; G06F 9/45558; G06F 9/48; G06F 9/4806; G06F 9/4843; G06F 9/485; G06F 9/4881; G06F 9/50; G06F 9/5005; G06F 9/5011; G06F 9/5022; G06F 9/5027; G06F 9/505; G06F 9/5061; G06F 9/5072; G06F 9/5077; G06F 9/5083
See application file for complete search history.

(56) References Cited

U.S. PATENT DOCUMENTS

| 7,844,480 B2 | 11/2010 | Ricketts |
| 8,898,402 B1 | 11/2014 | Stronge |

(Continued)

OTHER PUBLICATIONS

U.S. Appl. No. 16/217,454, filed Dec. 12, 2018, Aithal et al.
(Continued)

*Primary Examiner* — Charles M Swift
(74) *Attorney, Agent, or Firm* — Knobbe, Martens, Olson & Bear, LLP

(57) ABSTRACT

The present application relates to performing a scale-up of the computing resources allocated to executing a software application. For example, the software application for implementing a web server may be packaged as a container image, and one or more instances of the container images may be executed as one or more tasks. The individual tasks may be allocated a set of computing resources such as CPU and memory, and the incoming requests sent to the web server may be distributed across the tasks. If the volume of incoming requests drops below a threshold level, one or more of the tasks may be placed in standby mode, and the amount of computing resources allocated to such tasks may be reduced. When the volume of incoming requests returns above the threshold level, the amount of computing resources allocated to such tasks can be scaled back up to the full amount.

20 Claims, 7 Drawing Sheets

(51) Int. Cl.
*G06F 9/455* (2018.01)
*G06F 9/50* (2006.01)
*H04L 67/02* (2022.01)
*H04L 67/30* (2022.01)

(56) References Cited

U.S. PATENT DOCUMENTS

| | | |
|---|---|---|
| 9,110,496 B1 | 8/2015 | Michelsen |
| 9,152,441 B2 | 10/2015 | Anderson |
| 9,164,802 B2 | 10/2015 | Netto |
| 9,256,467 B1 | 2/2016 | Singh et al. |
| 9,549,038 B1 | 1/2017 | Anne |
| 9,667,498 B2 | 5/2017 | Wu et al. |
| 9,848,041 B2 | 12/2017 | Einkauf et al. |
| 9,898,347 B1 | 2/2018 | Gupta |
| 9,910,713 B2 | 3/2018 | Wisniewski et al. |
| 9,928,108 B1 | 3/2018 | Wagner et al. |
| 9,971,621 B1* | 5/2018 | Berg .................. G06F 9/5077 |
| 9,983,796 B2 | 5/2018 | Yang et al. |
| 10,067,801 B1 | 9/2018 | Wagner |
| 10,135,712 B2 | 11/2018 | Wu et al. |
| 10,191,778 B1* | 1/2019 | Yang .................. G06F 11/301 |
| 10,310,966 B1 | 6/2019 | Ge et al. |
| 10,397,255 B1 | 8/2019 | Bhalotra et al. |
| 10,432,551 B1 | 10/2019 | Vosshall et al. |
| 10,581,964 B2 | 3/2020 | Einkauf et al. |
| 10,606,646 B1 | 3/2020 | Christensen |
| 10,606,660 B1 | 3/2020 | Hartley et al. |
| 10,771,337 B1 | 9/2020 | Das et al. |
| 10,824,474 B1 | 11/2020 | Kamboj et al. |
| 10,871,995 B2 | 12/2020 | Gerdesmeier et al. |
| 10,901,764 B2 | 1/2021 | Tegtmeier et al. |
| 11,385,938 B2 | 7/2022 | Kim |
| 11,392,422 B1 | 7/2022 | Filiz et al. |
| 11,403,150 B1 | 8/2022 | Featonby et al. |
| 11,422,844 B1 | 8/2022 | Filiz et al. |
| 11,487,591 B1 | 11/2022 | Featonby |
| 11,573,816 B1 | 2/2023 | Featonby et al. |
| 2005/0002375 A1 | 1/2005 | Gokhale et al. |
| 2008/0282267 A1 | 11/2008 | Adam et al. |
| 2011/0246515 A1 | 10/2011 | Johnson et al. |
| 2012/0210326 A1 | 8/2012 | Torr et al. |
| 2012/0233668 A1 | 9/2012 | Leafe et al. |
| 2013/0124807 A1 | 5/2013 | Nielsen et al. |
| 2013/0160008 A1 | 6/2013 | Cawlfield et al. |
| 2013/0318132 A1 | 11/2013 | Basu et al. |
| 2014/0079207 A1 | 3/2014 | Zhakov et al. |
| 2014/0358710 A1 | 12/2014 | Balestrieri et al. |
| 2014/0366093 A1* | 12/2014 | Oh ........................ G06F 21/53 |
| | | 718/1 |
| 2015/0106805 A1 | 4/2015 | Melander et al. |
| 2015/0142878 A1 | 5/2015 | Hebert et al. |
| 2016/0077846 A1 | 3/2016 | Phillips et al. |
| 2016/0274928 A1 | 9/2016 | Linton et al. |
| 2016/0323377 A1 | 11/2016 | Einkauf et al. |
| 2016/0378559 A1 | 12/2016 | Bhandarkar et al. |
| 2017/0063659 A1 | 3/2017 | Platon et al. |
| 2017/0078433 A1 | 3/2017 | Radhakrishnan et al. |
| 2017/0090960 A1* | 3/2017 | Anderson ............. G06F 9/48 |
| 2017/0090961 A1 | 3/2017 | Wagner et al. |
| 2017/0115978 A1 | 4/2017 | Modi et al. |
| 2017/0140526 A1 | 5/2017 | Chen et al. |
| 2017/0177413 A1 | 6/2017 | Wisniewski et al. |
| 2017/0177860 A1 | 6/2017 | Suarez et al. |
| 2017/0177877 A1 | 6/2017 | Suarez et al. |
| 2017/0180346 A1 | 6/2017 | Suarez et al. |
| 2017/0339158 A1 | 11/2017 | Lewis et al. |
| 2017/0339196 A1 | 11/2017 | Lewis et al. |
| 2017/0371703 A1* | 12/2017 | Wagner .................. G06F 9/485 |
| 2018/0004503 A1 | 1/2018 | OlmstedThompson |
| 2018/0088993 A1 | 3/2018 | Gerdesmeier et al. |
| 2018/0101403 A1 | 4/2018 | Baldini Soares et al. |
| 2018/0129539 A1 | 5/2018 | Sadat |
| 2018/0150325 A1 | 5/2018 | Kuo et al. |
| 2018/0246745 A1 | 8/2018 | Aronovich et al. |
| 2018/0278639 A1 | 9/2018 | Bernstein et al. |
| 2018/0285204 A1 | 10/2018 | Dwarampudi et al. |
| 2018/0331971 A1 | 11/2018 | Certain et al. |
| 2018/0336345 A1 | 11/2018 | Georgiev |
| 2019/0050680 A1 | 2/2019 | Waugh et al. |
| 2019/0102231 A1 | 4/2019 | Wagner |
| 2019/0108049 A1 | 4/2019 | Singh et al. |
| 2019/0146772 A1 | 5/2019 | Griffin et al. |
| 2019/0146774 A1 | 5/2019 | Moore et al. |
| 2019/0149406 A1 | 5/2019 | Fratini |
| 2019/0188107 A1 | 6/2019 | Alston et al. |
| 2019/0243681 A1 | 8/2019 | Chen |
| 2019/0294477 A1 | 9/2019 | Koppes et al. |
| 2019/0324786 A1 | 10/2019 | Ranjan et al. |
| 2019/0340033 A1 | 11/2019 | Ganteaume |
| 2019/0347127 A1 | 11/2019 | Coady et al. |
| 2019/0392045 A1 | 12/2019 | De Lima Junior et al. |
| 2020/0051017 A1 | 2/2020 | Dujmic |
| 2020/0073649 A1 | 3/2020 | Viana et al. |
| 2020/0142711 A1 | 5/2020 | Varda et al. |
| 2020/0174842 A1 | 6/2020 | Wang et al. |
| 2020/0210227 A1* | 7/2020 | Xie ......................... G06F 9/54 |
| 2020/0213279 A1 | 7/2020 | Xiong et al. |
| 2020/0241930 A1 | 7/2020 | Garg et al. |
| 2020/0249977 A1 | 8/2020 | Mentz et al. |
| 2020/0310845 A1 | 10/2020 | Liguori et al. |
| 2020/0310850 A1 | 10/2020 | Liguori et al. |
| 2020/0356387 A1 | 11/2020 | Anwar et al. |
| 2020/0358719 A1 | 11/2020 | Mestery et al. |
| 2020/0412596 A1 | 12/2020 | Cherunni |
| 2021/0019179 A1* | 1/2021 | Yadav .................. G06F 9/5038 |
| 2021/0064442 A1 | 3/2021 | Alluboyina et al. |
| 2021/0089361 A1 | 3/2021 | Rafey et al. |
| 2021/0109775 A1 | 4/2021 | Shen et al. |
| 2021/0117217 A1 | 4/2021 | Croteau et al. |
| 2021/0141655 A1 | 5/2021 | Gamage et al. |
| 2021/0158083 A1 | 5/2021 | Gan et al. |
| 2021/0160162 A1 | 5/2021 | Abbas |
| 2021/0184942 A1 | 6/2021 | Tootaghaj et al. |
| 2021/0191748 A1* | 6/2021 | Ito ...................... H04L 41/5025 |
| 2021/0232344 A1 | 7/2021 | Corrie |
| 2021/0311764 A1 | 10/2021 | Rosoff et al. |
| 2021/0357255 A1 | 11/2021 | Mahadik et al. |
| 2022/0188167 A1 | 6/2022 | Iyer et al. |

OTHER PUBLICATIONS

U.S. Appl. No. 16/367,801, filed Mar. 28, 2019, Featonby et al.
U.S. Appl. No. 16/699,309, filed Nov. 29, 2019, Goodman et al.
U.S. Appl. No. 16/909,756, filed Jun. 23, 2020, Featonby et al.
Chavan, et al., "Clustered Virtual Machines for Higher Availability of Resources with Improved Scalability in Cloud Computing," 2014 IEEE, pp. 221-225.
Chen, et al., "Virtual Cluster: Customizing the Cluster Environment through Virtual Machines," 2008 IEEE, pp. 411-416.
Dettori, "Blueprint for Business Middleware as a Managed Cloud Service", IEEE International Conference on Cloud Engineering, 2014, pp. 261-270.
Sharifi, et al., "VCE: A New Personated Virtual Cluster Engine for Cluster Computing," 2008 IEEE, 6 pages.

* cited by examiner

SCALING UP COMPUTING RESOURCE ALLOCATIONS FOR EXECUTION OF CONTAINERIZED APPLICATIONS

BACKGROUND

Modern computer systems are frequently implemented as distributed collections of computer systems operating collectively within one or more host computer system environments. Such a host computer environment may deploy applications across multiple clusters of servers or virtual machines and manage the applications and the clusters on behalf of customers.

DETAILED DESCRIPTION

Introduction

Figure 1:
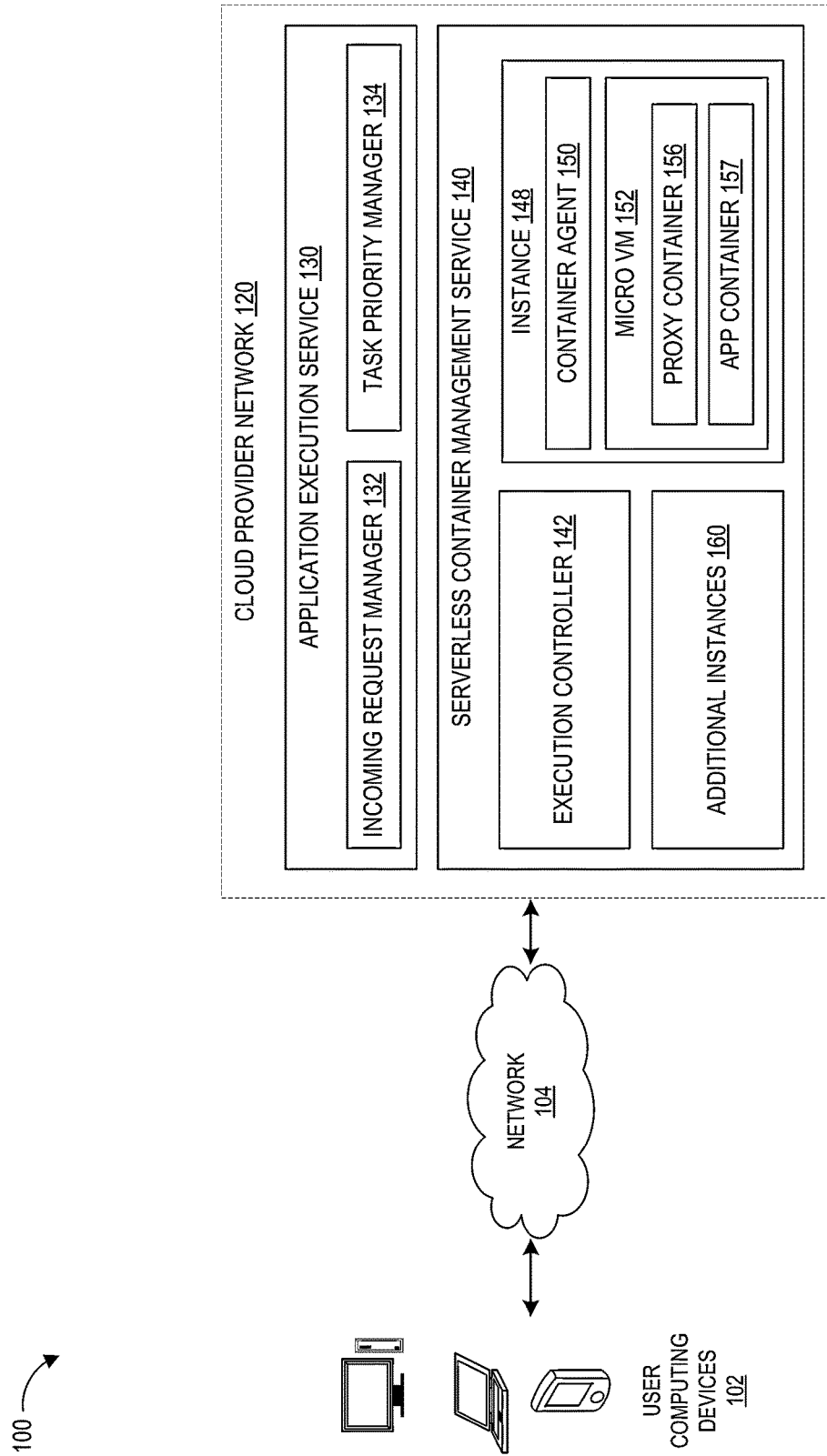
FIG. 1 depicts a schematic diagram of a network environment in which a cloud provider network is used to implement an application execution service and a serverless container management service in accordance with aspects of the present disclosure.

The present disclosure relates to techniques for scaling the computing resources allocated to executing individual instances of a containerized application. A developer can package a software application and everything else needed to run the application in a container image (e.g., a standalone, executable package of software that includes everything needed to run an application process) and send a request to a distributed computing environment, such as a cloud provider network, to execute the application using computing resources provided by the cloud provider network, such as CPU and memory. One example of such a software application is a web server application, which can be packaged in a web server container image and executed to implement a web server that can receive and respond to Hypertext Transfer Protocol (HTTP) requests. Additional instances of the web server container image may be executed in order to increase the number of HTTP requests that the web server can process concurrently.

Typically, a fixed set of computing resources (e.g., CPU, memory, disk, networking interface, etc.) may be reserved for use by each of the tasks implementing the web server. As the number of incoming HTTP requests decreases, there may not be enough requests to fully utilize the capacity provided by all of the tasks, and the utilization level of the computing resources allocated to the tasks may decrease, resulting in unused, idle computing resources.

To address this issue of having idle computing resources, in some cases, one or more of the running tasks may be terminated in order to improve utilization, and thereby reduce the amount of wasted computing resources. However, if the number of HTTP requests increases beyond the capacity provided by the reduced number of tasks, a new task would need to be executed ("cold start"), which would take a noticeable amount of time and thus result in degraded latency performance.

These aforementioned challenges, among others, are addressed in some embodiments by the disclosed techniques for managing incoming requests and tasks that can process such requests as well as scaling the computing resources allocated to the tasks and/or the number of tasks. These techniques can reduce the amount of idle computing resources as well as reduce the number of cold starts. By doing so, the system described in the present disclosure can reduce the computing resource costs associated with providing the application execution service, and also improve the latency performance associated with the application execution service.

As will be appreciated by one of skill in the art in light of the present disclosure, the embodiments disclosed herein improve the ability of computing systems, such as code execution systems and container systems, to provide mechanisms for managing computing resource allocations to improve resource utilization and latency performance and reduce the resource costs associated with execution of containerized applications. By routing the incoming requests according to dynamically adjusted task priority levels and scaling the computing resources allocated to the tasks and/or the number of tasks, the cloud provider network of the present disclosure can address the deficiencies described above.

Prior techniques for improving resource utilization generally relied on adding tasks when there is not enough capacity in the existing tasks to handle the incoming requests and removing tasks when there is too much idle capacity. However, as discussed above, such approaches may result in wasted resources in the event that a given task is not fully utilized, and also result in cold starts with significantly worse latency performance in the event that the volume of incoming requests exceeds the available capacity on the existing tasks.

In contrast, embodiments of the present disclosure enable multi-tiered scaling including tier-one scaling in which the resource allocations on the individual tasks are adjusted (e.g., without adjusting the number of running tasks) and tier-two scaling in which the number of running tasks is adjusted (e.g., increased or decreased) depending on the incoming traffic to be processed by the running tasks. By doing so, the computing resource scaling techniques described herein may (i) reduce the amount of idle computing resources and thus reduce the costs associated with providing an application execution service and (ii) reduce the number of cold starts and thus improve the latency performance associated with providing the application execution service.

The presently disclosed embodiments therefore address technical problems inherent within computing systems, such as improving resource utilization and reducing response times associated with software applications. These technical problems are addressed by the various technical solutions described herein, including scaling of computing resource allocations. Thus, the present disclosure represents an improvement on existing software execution systems, and computing systems in general.

These and other aspects of the disclosure will now be described with regard to certain examples and embodiments, which are intended to illustrate but not limit the disclosure. Although the examples and embodiments described herein will focus, for the purpose of illustration, on specific calculations and algorithms, one of skill in the art will appreciate the examples are illustrate only, and are not intended to be limiting.

Overview of Example Computing Environment for Application Execution Service

FIG. 1 depicts an example computing environment 100 including a cloud provider network 120 in which the disclosed application execution service and serverless container management service can be implemented. A cloud provider network (sometimes referred to as a cloud provider system or simply a "cloud") refers to a large pool of network-accessible computing resources (such as compute, storage, and networking resources, applications, and services), which may be virtualized (e.g., virtual machines) or bare-metal (e.g., bare-metal instances or physical machines). The cloud can provide convenient, on-demand network access to a shared pool of configurable computing resources that can be programmatically provisioned and released in response to customer commands. These resources can be dynamically provisioned and reconfigured to adjust to variable load, which provides the "elasticity" of the cloud provider network 120. Cloud computing can thus be considered as both the applications delivered as services over a publicly accessible network (e.g., the Internet, a cellular communication network) and/or the hardware and software in cloud provider data centers that provide those services. It will be appreciated that the disclosed techniques for scaling computing resources and/or tasks may be implemented in non-elastic computing environments as well.

The cloud provider network 120 can be accessed by user computing devices 102 over a network 104. The cloud provider network 120 may include an application execution service 130 and a serverless container management service 140 that are in networked communication with one another and with the network 104 to provide users with on-demand access to the services and resources provided by the cloud provider network 120.

The application execution service 130 includes an incoming request manager 132 for monitoring the incoming requests directed to one or more software applications executing on the cloud provider network 120 and a task priority manager 134 for managing the priority levels associated with the tasks used to implement the one or more software applications. Although not shown in FIG. 1, the application execution service 130 may include a network proxy that load-balances requests to the containers running on the instance 148. The techniques for monitoring the incoming requests, managing the priority levels associated with the tasks, and distributing the incoming requests across the tasks running on the serverless container management service 140 are described in greater detail below with reference to FIGS. 2-6.

The serverless container management service 140 includes an execution controller 142, an instance 148 that includes a container agent 150 and a micro virtual machine (microVM) 152, which is a lightweight virtual machine that is pre-provisioned, for example, on bare-metal instances, and additional instances 160. The microVM 152 may include a proxy container 156 and an application container 157. The proxy container 156 may be implemented as a sidecar container configured to run alongside the application container 157 and receive the requests forwarded from the application execution service 130 and forwards such requests to the application container 157. The proxy container 156 may be configured to receive (e.g., from a load balancer/server listening on the endpoint associated the software application implemented by the application container 157) requests directed to the endpoint associated the software application and to forward the requests to the application container 157. Although a single proxy container and a single application container are shown in FIG. 1, any number of such pairings can run on the microVM 152. The container agent 150 may configure the compute capacity acquired by the serverless container management service 140 (e.g., configure network namespaces, security groups, runtimes, and the like). The execution controller 142 may process requests from the application execution service 130 such as requests to execute a task on an instance provisioned and/or acquired by the serverless container management service 140, acquire compute capacity that can be used to execute such a task, and initiate the container agent 150 on the acquired compute capacity, as well as requests directed to an application (e.g., an HTTP request received at an endpoint associated with a web server) implemented by one or more running tasks.

The serverless container management service 140 may be a collection of computing resources that operate collectively to process task definitions to perform tasks as described herein by providing and managing container instances where the tasks and the associated containers can be executed. The computing resources configured to process task definitions and provide and manage container instances where the tasks and the associated containers can be executed include at least one of: computer systems (the computer systems including processors and memory), networks, storage devices, executable code, services, processes, modules, or applications. The computing resources configured to process task definitions and provide and manage container instances where the tasks and the associated containers can be executed may include virtual systems that are implemented on shared hardware hosted by, for example, a computing resource service provider, internal or external to the cloud provider network 120. The serverless container management service 140 may be implemented as a single system or may be implemented as a distributed system, with a plurality of instances operating collectively to process task definitions and provide and manage container instances where the tasks and the associated containers can be executed. The serverless container management service 140 receives task definitions, instantiates container instances, communicates with container instances, and/or otherwise manages container instances.

Although not shown in FIG. 1, the cloud provider network 120 may include a plurality of other services such as a container registry service for providing image repositories that can store the container images used to implement the software applications running on the cloud provider network 120, an object storage service for storing the source code usable to build container images, to name a few examples.

The application execution service 130 may provide a set of application programming interfaces ("APIs") that can be used by the users of the user computing devices 102 to request a software application (e.g., a web server configured to receive and respond to HTTP requests) to be implemented by executing one or more instances of the software application packaged as container images. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

A container, as referred to herein, packages up code and all its dependencies so an application (also referred to as a task, pod, or cluster in various container platforms) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example, by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. The instances, as used herein, may include such virtual machines. For example, some containers can be run on virtual machines that are running a container agent, and some containers can be run on baremetal servers.

In the context of some software container services, a task refers to a container, or multiple containers working together, running to execute the functionality of a software application or a particular component of that application. In some implementations, tasks can also include virtual machines, for example, virtual machines running within instance(s) hosting the container(s). A task definition can enable container images to be run in a cloud provider network to execute a task. A task definition can specify parameters including which container image to use with each container in the task, interactions between containers, constraints on container placement within a cloud provider network, what quantities of different hardware resources should be allocated to the task or to specific containers, networking modes, logging configurations, persistent storage that should be used with the containers in the task, and whether the task continues to run if a container finishes or fails. Multiple containers can be grouped into the same task definition, for example, linked containers that must be run together to execute related processes of an application, containers that share resources, or containers that are required to be run on the same underlying host. An entire application stack can span multiple task definitions by separating different components of the application into their own task definitions. An application can be defined using a service definition, which can specify configuration parameters that define the service including which task definition (s) to use, how many instantiations of each task to run, and how the tasks should be load balanced.

In some implementations, customers of a cloud provider network 120 can deploy containers by managing clusters of compute instances that run container agents (e.g., container agent 150). In such implementations, customers manage scaling, monitoring, patching, and security of the compute instances, in addition to managing their containerized workload. In some implementations, customers of a cloud provider may deploy and scale containerized workloads automatically without having to manage the underlying computing resources, for example, via a container management service that receives information from a customer about their workload and then automatically selects the appropriate compute resources to run the workload. Beneficially, such a "serverless container" approach abstracts away the underlying infrastructure, enabling the customer to simply focus on their containerized application, by managing clusters of compute instances on behalf of the customer.

The traffic and operations of the cloud provider network 120 may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information, etc.). The data plane includes customer resources that are implemented on the cloud provider network (e.g., computing instances, containers, block storage volumes, databases, file storage, etc.). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

The cloud provider network 120 (e.g., the compute service 115 or another provider of compute capacity) may provide the instances (also referred to as virtual compute instances, compute instances, virtual machine instances, virtual machines, bare-metal instances, microVMs, etc.) shown in FIG. 1 with varying computational and/or memory resources. In one embodiment, each of the virtual compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Each instance type can have a specific ratio of processing, local storage, memory, and networking resources, and different instance families may have differing types of these resources as well. Multiple sizes of these resource configurations can be available within a given instance type. Although the instances 148 and 160 are used as examples in FIG. 1, the compute resources usable by the application execution service 130 and/or the serverless container management service 140 include one or more of a virtual machine instance, a bare-metal instance, a microVM, a physical machine, a container, a node, an offload card, an IoT device, on-premises compute capacity (e.g., that associated with or in the same network as the user computing devices 102), or other forms of virtual or physical compute units that are configured to execute one or more applications.

In some implementations, at least a subset of virtualization management tasks may be performed at one or more offloading cards so as to enable more of the processing capacity of the host to be dedicated to client-requested compute instances—e.g., cards connected via Peripheral Component Interconnect (PCI) or Peripheral Component Interconnect Express (PCIe) to the physical CPUs and other components of the virtualization host may be used for some virtualization management components. Such an offload card of the host can include one or more CPUs and/or other computing resources that are not available to customer instances, but rather are dedicated to instance management tasks such as virtual machine management, input/output virtualization to network-attached storage volumes, local migration management tasks, instance health monitoring, and the like. Alternatively or additionally, such an offload card may provide additional computing resources usable by customer instances.

As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client (e.g., user computing device 102).

Some implementations of the cloud provider network 120 can additionally include block store servers, compute servers, object storage servers, domain name services ("DNS") servers, relational database servers, and other server configurations (not illustrated) for supporting on-demand cloud computing platforms. Each server (or service illustrated in FIG. 1) includes hardware computer memory and/or processors, an operating system that provides executable program instructions for the general administration and operation of that server, and a computer-readable medium storing instructions that, when executed by a processor of the server, allow the server to perform its intended functions.

The cloud provider network 120 can be formed as a number of regions, where a region is a separate geographical area in which the cloud provider clusters data centers. Each region can include two or more availability zones connected to one another via a private high speed network, for example, a fiber communication connection. An availability zone (also known as an availability domain, or simply a "zone" or an "AZ") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. An edge location can be an extension of the cloud provider network outside of the traditional region/AZ context. For example an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the cloud provider network to provide low latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network 120 can provide on-demand, scalable computing platforms to users through the network 104, for example, allowing users to have at their disposal scalable physical and/or virtual computing devices via their use of the instances illustrated in FIG. 1. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

As illustrated in FIG. 1, the cloud provider network 120 can communicate over network 104 with user computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. The user computing devices 102 can include any network-equipped computing device, for example, desktop computers, laptops, smartphones, tablets, e-readers, gaming consoles, and the like. Users can access the cloud provider network 120 via the network 104 to view or manage their data and computing resources, as well as to use websites and/or applications hosted by the cloud provider network 120.

The cloud provider network 120 may implement various computing resources or services (some of which may not be illustrated in FIG. 1), which may include a virtual compute service (referred to in various implementations as an elastic compute service, a virtual machines service, a computing cloud service, a compute engine, or a cloud compute service), a container orchestration and management service (referred to in various implementations as a container service, cloud container service, container engine, or container cloud service), a Kubernetes-based container orchestration and management service (referred to in various implementations as a container service for Kubernetes, Azure Kubernetes service, IBM cloud Kubernetes service, Kubernetes engine, or container engine for Kubernetes), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider network 120, in contrast to resources requested by users of the cloud provider network 120, which may be provisioned in user accounts. The disclosed techniques for scaling the computing resources and/or tasks can be implemented as part of a virtual compute service, container service, or Kubernetes-based container service in some embodiments.

In some embodiments, the execution of compute instances is supported by a lightweight virtual machine manager (VMM). These VMMs enable the launch of lightweight microVMs in non-virtualized environments in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

Although some embodiments of the present disclosure describe an instance as being a virtual machine, an instance, as used herein, may refer to any one of a virtual machine instance, a bare-metal instance, a microVM, a physical machine, a container, a node, an offload card, an IoT device, on-premises compute capacity, or another unit of compute capacity configurable to execute user code. Such an instance may reside within the cloud provider network 120 or within an on-premises environment outside the cloud provider network 120.

Example Routine for Executing a Task and Performing a Scale-Up

Figure 2:
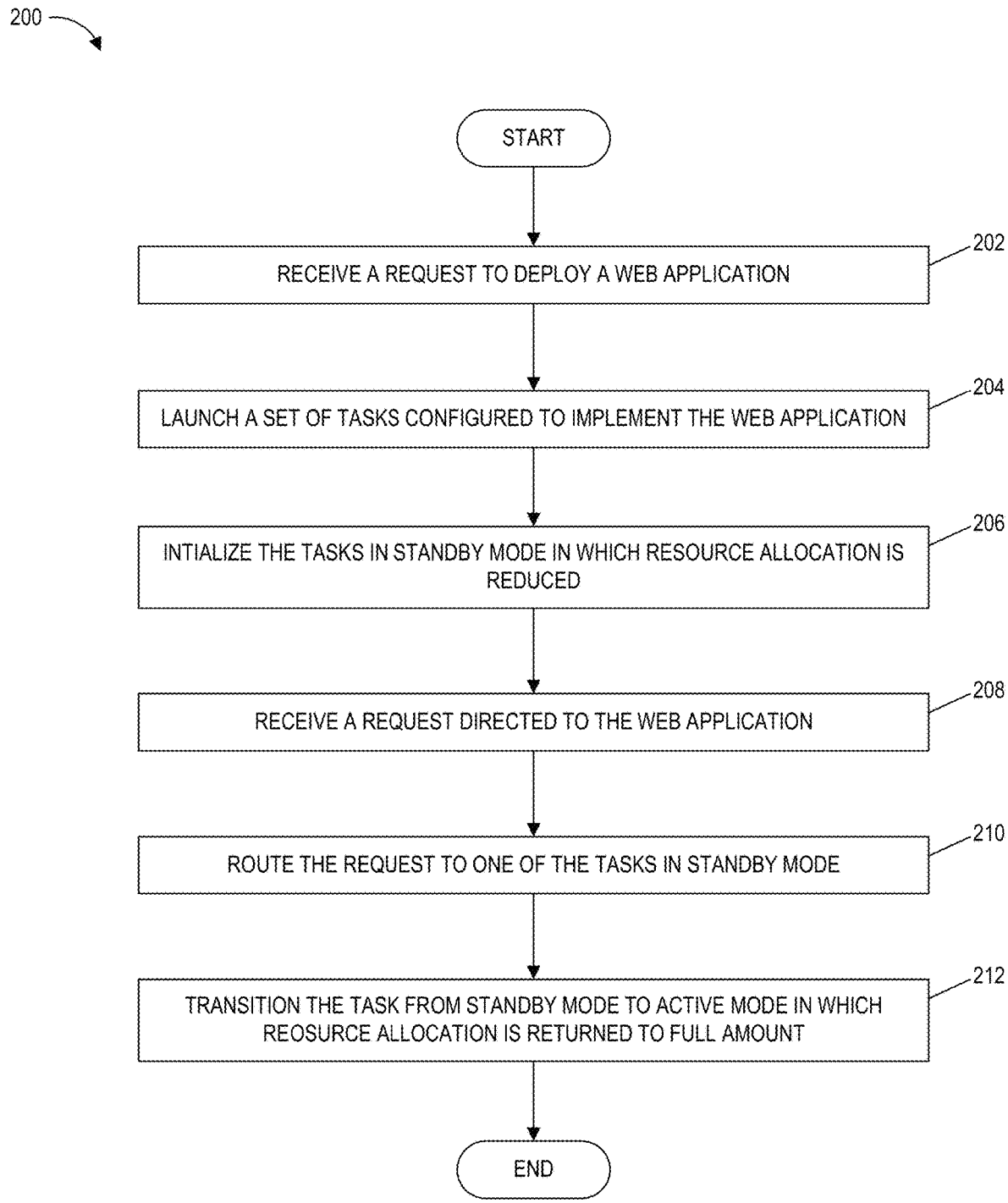
FIG. 2 is a flowchart of an example process for executing a task and scaling up the computing resources allocated to a task in accordance with aspects of the present disclosure.

FIG. 2 depicts an illustrative routine 200 for executing a task and scaling up the computing resources allocated to a task in accordance with aspects of the present disclosure. The routine 200 may be carried out, for example, at least in part, by the application execution service 130 (or a component thereof) or one or more other components of the cloud provider network 120 described herein (e.g., the serverless container management service 140). For convenience, some or all of the steps of the routine 200 are described as being performed by the application execution service 130. For example, the application execution service 130 may include one or more hardware computing devices and non-transitory physical computer storage storing instructions that, when executed by the one or more hardware computing devices, cause the one or more hardware computing devices to perform the steps of the routine 200.

The routine 200 begins at block 202, at which the application execution service 130 receives a request to deploy a web application. For example, the web application can be a web server configured to receive and respond to HTTP requests transmitted by user computing devices 102. Although a web application is used herein as an example, the scale-up and scale-down techniques described herein can be applied to other types of software applications.

At block 204, the application execution service 130 launches a set of tasks (the number of tasks is configurable by the user) configured to implement the web application. For example, the application execution service 130 may determine that the request received at block 202 (or another default value accessible by the application execution service 130) indicates that ten tasks are to be launched to implement the web application. Incoming requests received by the web application (e.g., those transmitted by the user computing devices 102 to a URL associated with the web application) may be distributed across the ten tasks that are initially launched. The number of tasks associated with the web application may be adjusted, for example, based on the number of incoming requests and/or the number of requests being processed by (or waiting to be processed by) the individual tasks. This type of adjustment is also referred to herein as tier 2 scaling (e.g., launching and/or terminating the tasks based on the incoming traffic and/or load on the individual tasks). Launching the set of tasks may include, for example, for each task, downloading one or more container images to be executed as part of the task from a container registry, and executing the container images using the execution parameters (e.g., those included in the task definition associated with the task) associated with the task, establishing connections to one or more databases accessible by the task, and initializing one or more caches accessible by the task.

At block 206, the application execution service 130 initializes the tasks in standby mode in which resource allocation is reduced. The request received at block 202 (or another default value accessible by the application execution service 130) may indicate that a specific amount of computing resources is to be allocated to each task implementing the web application. For example, the request may indicate that each task is to be allocated 2 CPUs and 4 GBs of memory. Despite the tasks being associated with this user-requested resource amount, the application execution service 130 may place the tasks in standby mode and allocate a smaller amount of resources (e.g., a percentage of the user-requested resource amount such as 0.5% of 2 CPUs and 4 GBs of memory, or a default amount such as 0.05 units of CPU and 0.05 MBs of memory) to the tasks until requests are routed to such tasks. By doing so, the application execution service 130 can reduce the amount of idle computing resources and reduce the computing resource costs associated with providing the application execution service to the user computing devices 102. The application execution service 130 (or the serverless container management service 140) may place a task in standby mode by throttling the computing resources allocated to the task (e.g., one or both of the proxy container 156 and the application container 157 of FIG. 1). For example, the computing resources can be throttled by limiting the resource usage using cgroups (a Linux kernel feature that limits, accounts for, and isolates the resource usage (e.g., CPU, memory, disk I/O, network, etc.) of a collection of processes). The resource allocations may be defined as a percentage of all resources available on the microVM 152. In some embodiments, after a task has been placed in standby mode, the application execution service 130 may cause some or all of the reduced amount of computing resources (e.g., the difference between the resource allocation amount in active mode and the resource allocation amount in standby mode) to be allocated to one or more other tasks on the same microVM 152 or on the same instance 148 or to be made available for allocation to one or more future tasks subsequently launched on the on the same microVM 152 or on the same instance 148.

At block 208, the application execution service 130 receives a request directed to the web application. For example, the request may be an HTTP request transmitted by a user computing device 102 to a URL associated with the web application.

At block 210, the application execution service 130 routes the request to one of the tasks in standby mode. The techniques for determining the task to which the request is to be routed are described in greater detail below with reference to FIG. 3. If the application execution service 130 routes the request to one of the tasks that are currently running, the request may result in a warm start (e.g., defined in some embodiments as having a request latency overhead less than 1 second, such as 15-50 ms or 100-300 ms, for example). In other cases, the application execution service 130 may route the request to a new task that has not yet been launched. Such a request would result in a cold start (e.g., defined in some embodiments as having a request latency overhead greater than 1 second, such as 2-3 seconds or 5-7 seconds, for example).

At block 212, the application execution service 130 transitions the task from standby mode to active mode in which resource allocation is returned to the full amount. The task may process and respond to the request using the computing resources made available as a result of the transition from standby mode to active mode. For example, the full amount of resources may be the amount of resources requested to be allocated to the task by the user or the amount of resources to be allocated to the task by default, and the reduced amount of resources may be any amount of resources less than the full amount of resources (e.g., zero, a percentage of the full amount (e.g., 0.5%, 50%, etc.), a fixed minimum amount of resources, etc.). In some embodiments, there may be multiple levels of resource amounts to which the first task can be transitioned to (e.g., 0%, 25%, 50%, 75%, 100%) according to the load on the first task. For example, at block 212, the application execution service 130 may cause the resource allocation to transition from the resource amount while the task is in standby mode (e.g., zero or a minimum amount) to the next level (e.g., 25%), and continue to transition to the next levels based on the resource utilization associated with the task. The routine 200 may then end.

The routine 200 can include fewer, more, or different blocks than those illustrated in FIG. 2 and/or one or more blocks illustrated in FIG. 2 may be modified, omitted, or switched without departing from the scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Routing a Request to a Task

Figure 3:
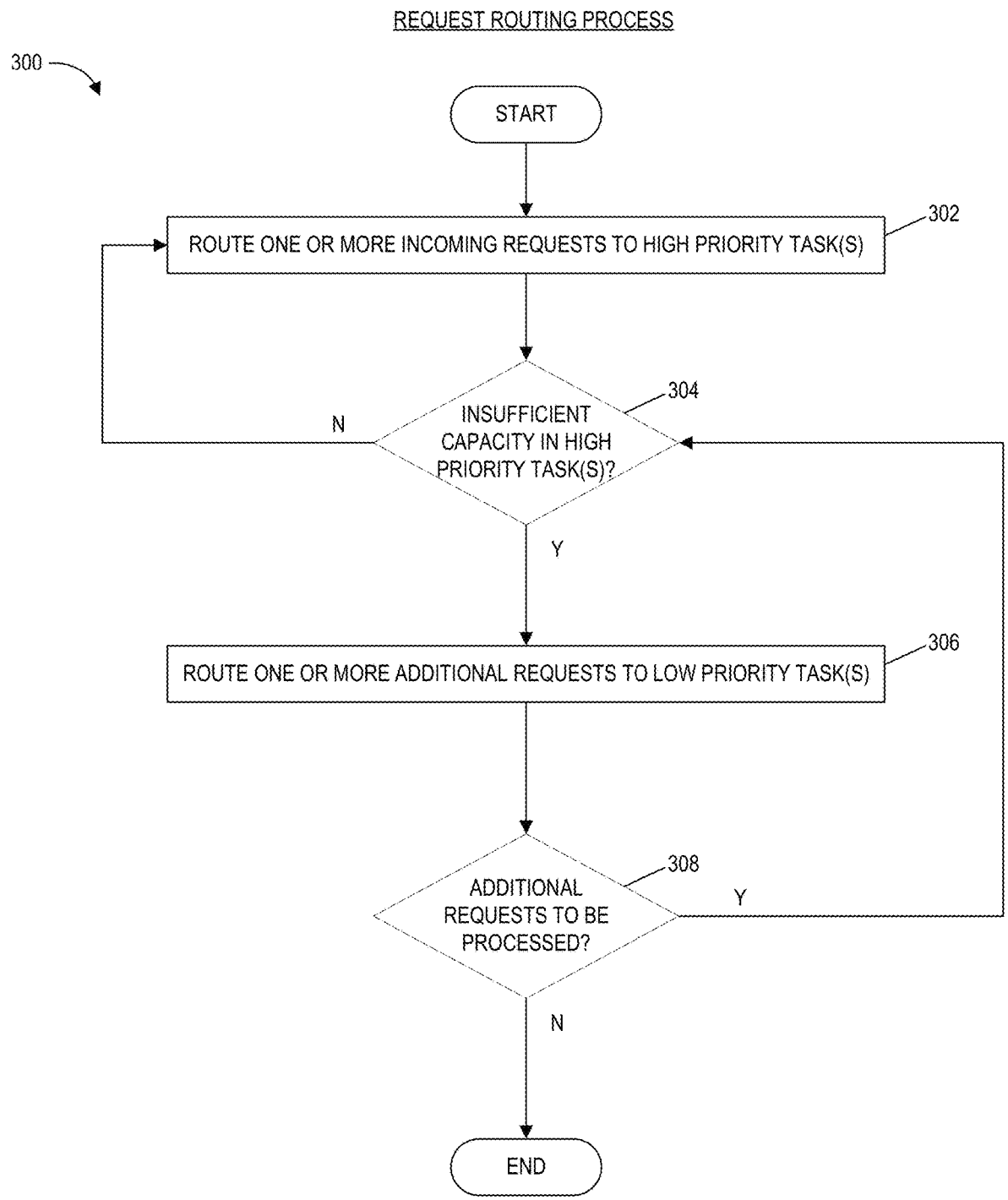
FIG. 3 is a flowchart of an example process for routing a request to a task in accordance with aspects of the present disclosure.

FIG. 3 depicts an illustrative routine 300 for routing a request to a task in accordance with aspects of the present disclosure. The routine 300 may be carried out, for example, at least in part, by the application execution service 130 (or a component thereof) or one or more other components of the cloud provider network 120 described herein (e.g., the serverless container management service 140). For convenience, some or all of the steps of the routine 300 are described as being performed by the application execution service 130. For example, the application execution service 130 may include one or more hardware computing devices and non-transitory physical computer storage storing instructions that, when executed by the one or more hardware computing devices, cause the one or more hardware computing devices to perform the steps of the routine 300.

The routine 300 begins at block 302, at which the application execution service 130 routes one or more incoming requests to high priority task(s). For example, the set of tasks being executed to implement the web application may divided into (and categorized as) low priority tasks and high priority tasks. The application execution service 130 may route incoming requests to only high priority tasks until one or more criteria for routing incoming requests to low priority tasks are met. Alternatively, the application execution service 130 may continue to route incoming requests to only high priority tasks, but if one or more criteria for upgrading a low priority task are met, the application execution service 130 may transition the low priority task to a high priority task so that incoming requests can also be routed to the upgraded task. In some embodiments, if the application execution service 130 is experiencing a first excess volume of incoming requests, the application execution service 130 may route incoming requests to only high priority tasks, and transition one or more tasks from low priority to high priority until the first excess volume falls below a first threshold level, and if the application execution service 130 is experiencing a second excess volume of incoming requests greater than the first excess volume, the application execution service 130 may begin routing incoming requests to not only high priority tasks but also one or more low priority tasks as well as transition one or more tasks from low priority to high priority until the second excess volume falls below a second threshold level greater than the first threshold level.

At block 304, the application execution service 130 determines whether there is insufficient capacity in the high priority tasks. For example, the application execution service 130 may determine that there is insufficient capacity based on receiving one or more errors from the high priority tasks, one or more indications that requests previously routed to the high priority tasks could not be processed, one or more indications from the high priority tasks that they do not have sufficient capacity, and/or one or more indications from the high priority tasks that they are above a threshold utilization level individually (e.g., each high priority task is above 90% utilization) or collectively (e.g., an average utilization across all high priority tasks is above 90%). If the application execution service 130 determines that there is sufficient capacity in the high priority tasks, the routine 300 returns to block 302 to continue to route incoming requests to high priority tasks. Otherwise, the routine 300 proceeds to block 306, where the application execution service 130 routes one or more of the incoming requests to one or more low priority tasks.

At block 308, the application execution service 130 determines whether there exist additional requests to be processed. If the application execution service 130 determines that there exist additional requests to be processed, the routine 300 proceeds to block 304 to continue to route the additional requests. Otherwise, the routine 300 may then end.

The routine 300 can include fewer, more, or different blocks than those illustrated in FIG. 3 and/or one or more blocks illustrated in FIG. 3 may be modified, omitted, or switched without departing from the scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Upgrading the Priority Level of a Task

Figure 4:
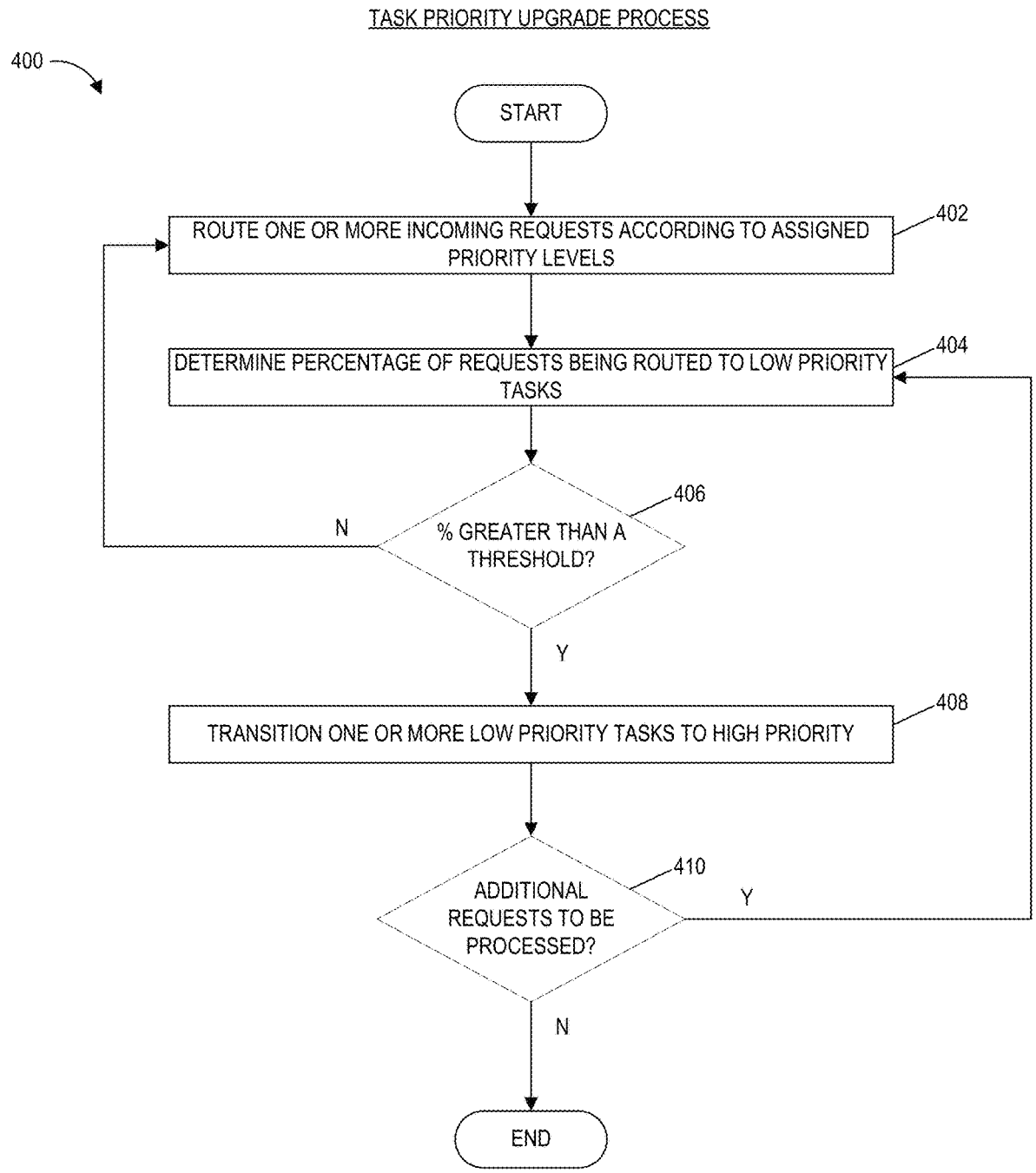
FIG. 4 is a flowchart of an example process for upgrading the priority level associated with a task in accordance with aspects of the present disclosure.

FIG. 4 depicts an illustrative routine 400 for upgrading the priority level associated with a task in accordance with aspects of the present disclosure. The routine 400 may be carried out, for example, at least in part, by the application execution service 130 (or a component thereof) or one or more other components of the cloud provider network 120 described herein (e.g., the serverless container management service 140). For convenience, some or all of the steps of the routine 400 are described as being performed by the application execution service 130. For example, the application execution service 130 may include one or more hardware computing devices and non-transitory physical computer storage storing instructions that, when executed by the one or more hardware computing devices, cause the one or more hardware computing devices to perform the steps of the routine 400.

The routine 400 begins at block 402, at which the application execution service 130 routes one or more incoming tasks according to assigned priority levels. In some embodiments, the application execution service 130 routes incoming requests to high priority tasks by default, and routes a subset of the incoming requests to low priority tasks if one or more criteria for routing to low priority tasks are met (e.g., utilization across high priority tasks is above a threshold level, a request has been denied by a threshold number (one, a specific number, or all) of the high priority tasks, a request has resulted in an error a threshold number of times (one or a specific number), etc.). For example, if the application execution service 130 determines that a request sent to a high priority task has failed, has been denied, or has resulted in an error, the application execution service 130 may retry the request by routing the request to a low priority task.

At block 404, the application execution service 130 determines a percentage of the incoming requests being routed to low priority tasks. For example, if five requests of the last ten requests have been routed to low priority tasks, the percentage may be 50%. In some embodiments, a ratio may be used instead of a percentage. For example, the application execution service 130 may determine the ratio of (i) HTTP requests routed to low-priority-level tasks of a web server to (ii) HTTP requests routed to high-priority-level tasks of the same web server.

At block 406, the application execution service 130 determines whether the percentage of the incoming requests being routed to low priority tasks is greater than a threshold level. If the application execution service 130 determines that the percentage of the incoming requests being routed to low priority tasks is not greater than a threshold level, the routine 400 returns to block 402 to continue to route additional incoming requests. Otherwise, the routine 400 proceeds to block 408.

At block 408, the application execution service 130 transitions one or more tasks from low priority to high priority. For example, the application execution service 130 may modify the priority level associated with the tasks in a database. In some embodiments, the application execution service 130 may preemptively promote a task from low priority to high priority (e.g., even before any requests have been sent to any low priority tasks) based on the utilization of the high priority tasks crossing a threshold (e.g., when the ratio of (i) requests routed to high priority tasks associated with a web application to (ii) the aggregate concurrency limit of all high priority tasks associated with the web application has reached or exceeded a threshold value, or when the ratio of (i) requests currently being processed by and/or have been routed to high priority tasks associated with a web application (ii) the aggregate concurrency limit of all high priority tasks associated with the web application has reached or exceeded a threshold value).

At block 410, the application execution service 130 determines whether there exist additional requests to be processed. If the application execution service 130 determines that there exist additional requests to be processed, the routine 400 proceeds to block 404 to continue to route the additional requests. Otherwise, the routine 400 may then end.

The routine 400 can include fewer, more, or different blocks than those illustrated in FIG. 4 and/or one or more blocks illustrated in FIG. 4 may be modified, omitted, or switched without departing from the scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Downgrading the Priority Level of a Task

Figure 5:
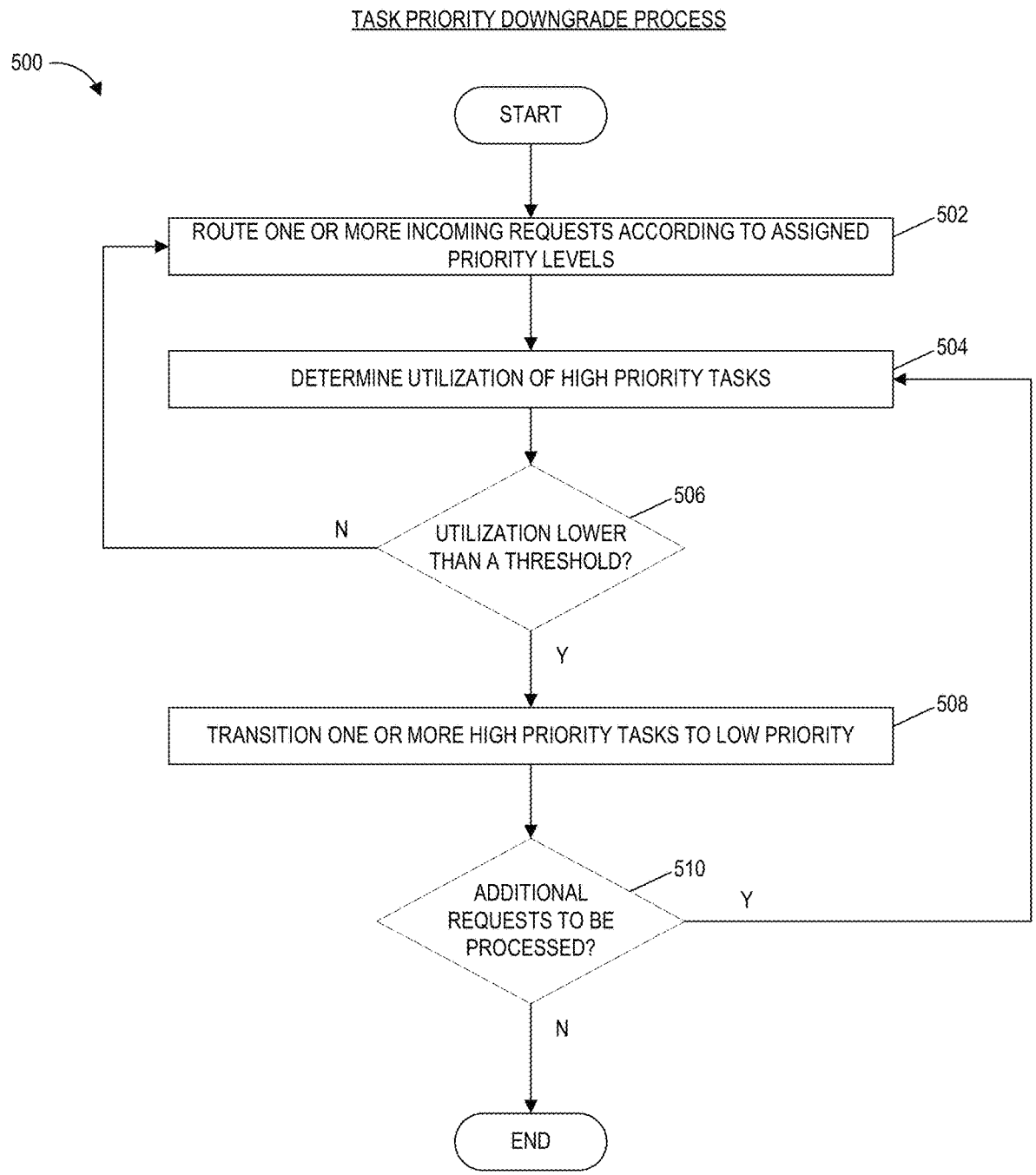
FIG. 5 is a flowchart of an example process for downgrading the priority level associated with a task in accordance with aspects of the present disclosure.

FIG. 5 depicts an illustrative routine 500 for downgrading the priority level associated with a task in accordance with aspects of the present disclosure. The routine 500 may be carried out, for example, at least in part, by the application execution service 130 (or a component thereof) or one or more other components of the cloud provider network 120 described herein (e.g., the serverless container management service 140). For convenience, some or all of the steps of the routine 500 are described as being performed by the application execution service 130. For example, the application execution service 130 may include one or more hardware computing devices and non-transitory physical computer storage storing instructions that, when executed by the one or more hardware computing devices, cause the one or more hardware computing devices to perform the steps of the routine 500.

The routine 500 begins at block 502, at which the application execution service 130 routes one or more incoming tasks according to assigned priority levels. In some embodiments, the application execution service 130 routes incoming requests to high priority tasks by default, and routes a subset of the incoming requests to low priority tasks if one or more criteria for routing to low priority tasks are met (e.g., utilization across high priority tasks is above a threshold level, a request has been denied by a threshold number (one, a specific number, or all) of the high priority tasks, a request has resulted in an error a threshold number of times (one or a specific number), etc.). For example, if the application execution service 130 determines that a request sent to a high priority task has failed, has been denied, or has resulted in an error, the application execution service 130 may retry the request by routing the request to a low priority task.

At block 504, the application execution service 130 determines a utilization level associated with the high priority tasks. For example, for a given high priority task, the application execution service 130 may determine that the high priority task has 4 CPUs allocated thereto and that the high priority task is currently using 2 CPUs for processing requests to the web application, the application execution service 130 may determine that the utilization level is 50% and use this number to determine whether the given high priority task is to be downgraded. As another example, the application execution service 130 may determine the utilization level for each high priority task and determine an aggregate utilization level to be used to downgrade one or more of the task priority levels. As yet another example, the application execution service 130 may determine the utilization level by dividing the number of requests that a given task is processing by the concurrency limit associated with the given task. In such an example, if the task is configured to process 10 requests concurrently but is only servicing (and/or waiting to process) 6 requests at the time, the utilization level of the task may be calculated as 60%. This concurrency limit can be specified by the user (e.g., using an API provided by the application execution service 130).

At block 506, the application execution service 130 determines whether the utilization level is not greater than a threshold level. If the application execution service 130 determines that the utilization level is lower than a threshold level, the routine 500 returns to block 502 to continue to route additional incoming requests. Otherwise, the routine 500 proceeds to block 508.

At block 508, the application execution service 130 transitions one or more tasks from high priority to low priority. For example, the application execution service 130 may modify the priority level associated with the tasks in a database. In some embodiments, the task priority downgrade process is performed at the task level. For example, the blocks 506 and 508 may be performed for each high priority task, and each high priority task that has a utilization level lower than a threshold may be transitioned to low priority. In other embodiments, the task priority downgrade process is performed at the application level or fleet level. For example, the application execution service 130 may, at block 506, determine an aggregate utilization level of the entire fleet of tasks (or just high priority tasks) used to implement the web application, and at block 508, transition one or more high priority tasks in the fleet to low priority (e.g., until the aggregate utilization is at or above the threshold level). Although utilization is used to demote one or more high priority tasks to low priority in the example of FIG. 5, in other embodiments, the percentage or ratio described with reference to block 404 may be used instead. For example, the application execution service 130 may determine that the ratio of the number of requests being sent to low priority tasks of a web application to the number of requests being sent to high priority tasks is lower than a threshold level (e.g., zero, which would indicate that high priority tasks have enough capacity to process all incoming requests), the application execution service 130 may cause one or more high priority tasks to be demoted to low priority.

At block 510, the application execution service 130 determines whether there exist additional requests to be processed. If the application execution service 130 determines that there exist additional requests to be processed, the routine 500 proceeds to block 504 to continue to route the additional requests. Otherwise, the routine 500 may then end.

The routine 500 can include fewer, more, or different blocks than those illustrated in FIG. 5 and/or one or more blocks illustrated in FIG. 5 may be modified, omitted, or switched without departing from the scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Performing a Scale-Down

Figure 6:
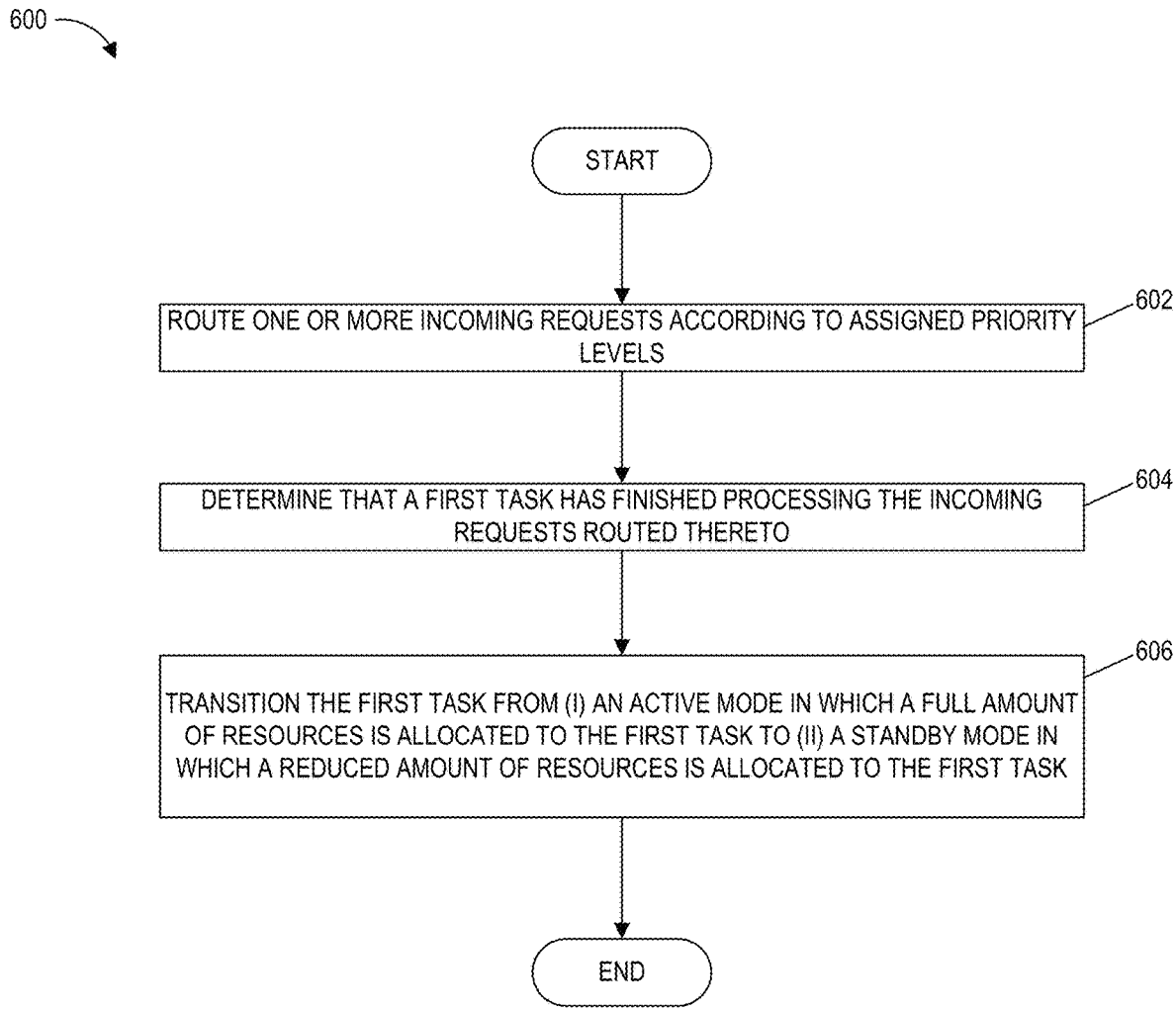
FIG. 6 is a flowchart of an example process for scaling down the computing resources allocated to a task in accordance with aspects of the present disclosure.

FIG. 6 depicts an illustrative routine 600 for scaling down the computing resources allocated to a task in accordance with aspects of the present disclosure. The routine 600 may be carried out, for example, at least in part, by the application execution service 130 (or a component thereof) or one or more other components of the cloud provider network 120 described herein (e.g., the serverless container management service 140). For convenience, some or all of the steps of the routine 600 are described as being performed by the application execution service 130. For example, the application execution service 130 may include one or more hardware computing devices and non-transitory physical computer storage storing instructions that, when executed by the one or more hardware computing devices, cause the one or more hardware computing devices to perform the steps of the routine 600.

The routine 600 begins at block 602, at which the application execution service 130 routes one or more incoming requests according to assigned priority levels. For example, the application execution service 130 may route the incoming requests as described with reference to blocks 402 and 502.

At block 604, the application execution service 130 determines that a first task of a plurality of tasks implementing the web application has finished processing the incoming requests routed thereto. For example, the application execution service 130 may determine that the first task has finished processing the incoming requests routed to the first task based on determining that the first task does not have any pending requests waiting to be processed by the first task.

At block 606, the application execution service 130 transitions the first task from (i) an active mode in which a full amount of resources is allocated to the first task to (ii) a standby mode in which a reduced amount of resources is allocated to the first task. For example, the full amount of resources may be the amount of resources requested to be allocated to the task by the user or the amount of resources to be allocated to the task by default, and the reduced amount of resources may be any amount of resources less than the full amount of resources (e.g., zero, a percentage of the full amount (e.g., 0.5%, 50%, etc.), a fixed minimum amount of resources, etc.). In some embodiments, there may be multiple levels of resource amounts to which the first task can be transitioned to (e.g., 0%, 25%, 50%, 75%, 100%) according to the load on the first task or the resource utilization associated with the first task. In some embodiments, the application execution service 130 may wait for a predetermined amount of time (e.g., a cooldown period) after the determination at block 604 before performing the transitioning at block 606. Additionally or alternatively, the application execution service 130 may terminate one or more tasks based on the utilization of the running tasks and/or the volume of incoming requests. The routine 600 may then end.

The routine 600 can include fewer, more, or different blocks than those illustrated in FIG. 6 and/or one or more blocks illustrated in FIG. 6 may be modified, omitted, or switched without departing from the scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Architecture of Computing System

Figure 7:
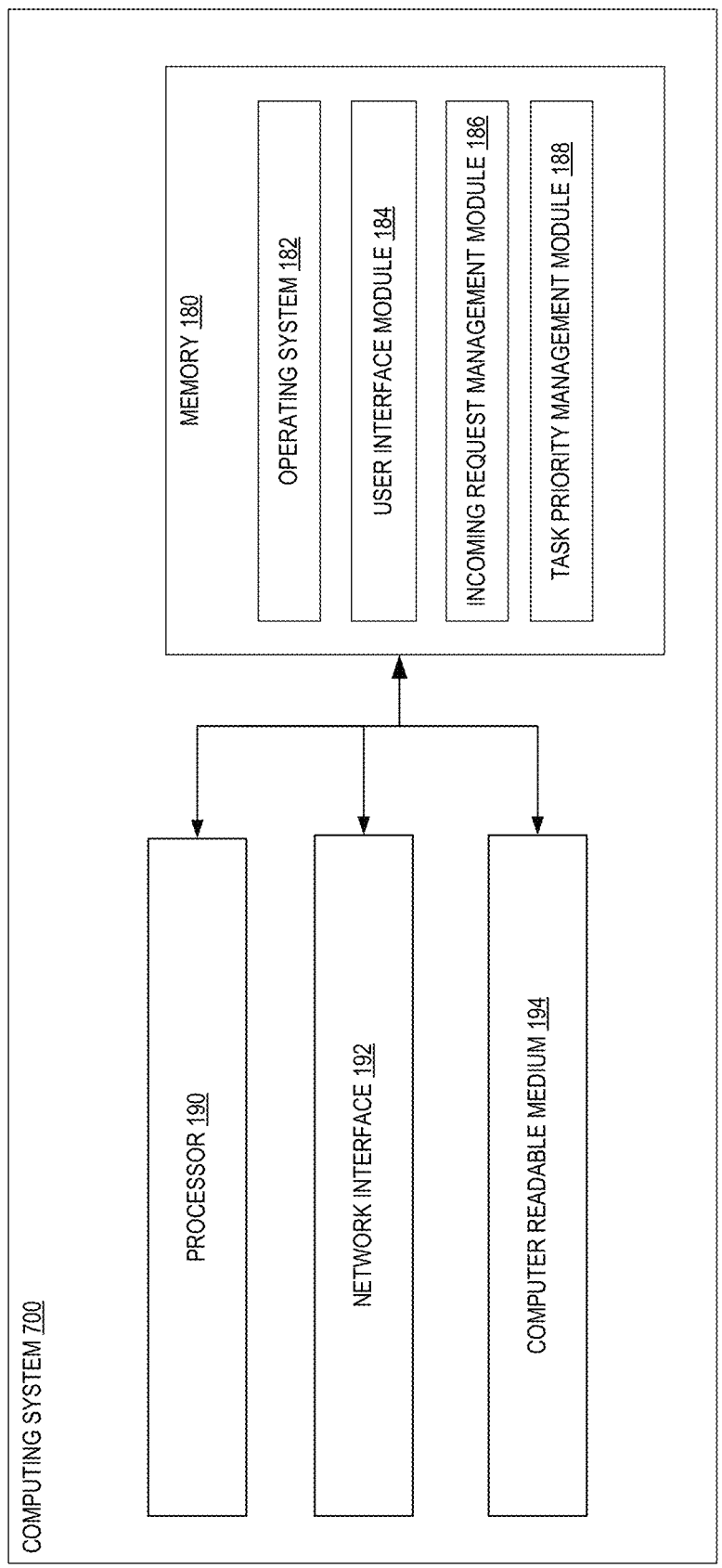
FIG. 7 depicts a general architecture of a computing device or system usable to implement one or more components descried herein, in accordance with aspects of the present disclosure.

FIG. 7 depicts an example architecture of a computing system 700 that can be used to perform one or more of the techniques described herein or illustrated in FIGS. 1-6. The general architecture of the computing system 700 depicted in FIG. 7 includes an arrangement of computer hardware and software modules that may be used to implement one or more aspects of the present disclosure. The computing system 700 may include many more (or fewer) elements than those shown in FIG. 7. It is not necessary, however, that all of these elements be shown in order to provide an enabling disclosure. For example, the computing system 700 may be used to implement one or more of the elements described herein, including the container registry service 130, application execution service 130, object storage service 110, compute service 115, and/or the user computing devices 102.

As illustrated, the computing system 700 includes a processor 190, a network interface 192, and a computer-readable medium 194, all of which may communicate with one another by way of a communication bus. The network interface 192 may provide connectivity to one or more networks or computing systems. The processor 190 may thus receive information and instructions from other computing systems or services via the network 104 illustrated in FIG. 1.

The processor 190 may also communicate with memory 180. The memory 180 may contain computer program instructions (grouped as modules in some embodiments) that the processor 190 executes in order to implement one or more aspects of the present disclosure. The memory 180 may include RAM, ROM, and/or other persistent, auxiliary, or non-transitory computer-readable media. The memory 180 may store an operating system 182 that provides computer program instructions for use by the processor 190 in the general administration and operation of the computing system 700. The memory 180 may further include computer program instructions and other information for implementing one or more aspects of the present disclosure. For example, in one embodiment, the memory 180 includes a user interface module 184 that generates user interfaces (and/or instructions therefor) for display upon a user computing device (e.g., user computing device 102 of FIG. 1), e.g., via a navigation and/or browsing interface such as a browser or application installed on the user computing device. In addition, the memory 180 may include or communicate with one or more data stores.

In addition to and/or in combination with the user interface module 184, the memory 180 may include an incoming request management module 186 and a task priority management module 188 that may be executed by the processor 190. In one embodiment, the incoming request management module 186 and the task priority management module 188 may collectively implement various aspects of the present disclosure, e.g., those illustrated in FIGS. 1-6 or described with reference to FIGS. 1-6.

Although a single processor, a single network interface, a single computer-readable medium, and a single memory are illustrated in the example of FIG. 7, in other implementations, the computing system 700 can have a multiple of one or more of these components (e.g., two or more processors and/or two or more memories).

Example Implementations (EIs)

Some enumerated example implementations (EIs) are provided in this section, without limitation.

EI 1: A cloud provider system comprising: a serverless container management service configured to acquire compute capacity and execute a task using the acquired compute capacity in response to a request to execute the task; and an application execution service in networked communication with the serverless container management service, wherein the application execution service is configured to at least: receive a request to deploy a Web application configured to handle a plurality of HTTP requests; and transmit, to the serverless container management service, a task execution request to execute a set of tasks to be used to implement the Web application, wherein the set of tasks includes at least a first task and a second task that are each configured to handle a subset of the plurality of HTTP requests directed to the Web application, and wherein the task execution request indicates that each of the set of tasks is to be allocated a first amount of computing resources, wherein the serverless container management service is further configured to at least: in response to the task execution request from the application execution service, cause the set of tasks to be executed, wherein each task of the set of tasks is placed in a standby mode in which a resource allocation associated with the task is reduced to a second amount of computing resources that is less than the first amount of computing resources; and in response to an HTTP request routed to the first task, cause the first task to be placed in an active mode in which the resource allocation associated with the first task is returned to the first amount of computing resources, wherein the application execution service is further configured to at least: based at least in part on the first task associated with the Web application being at a first priority level and the second task associated with the Web application being at a second priority level lower than the first priority level, route a set of HTTP requests directed to the Web application to the first task, such that the second task continues to stay in the standby mode while the first task is processing the set of HTTP requests; and based at least in part on the first task not having enough capacity to handle an additional HTTP request directed to the Web application, route the additional HTTP request to the second task, and wherein the serverless container management service is further configured to at least: in response to the additional HTTP request routed to the second task, cause the second task to be placed in an active mode in which the resource allocation associated with the second task is returned to the first amount of computing resources.

EI 2: The cloud provider system of EI 1, wherein the application execution service is configured to, prior to routing the additional HTTP request to the second task, promote the second task to the first priority level.

EI 3: The cloud provider system of EI 1, wherein the application execution service is configured to route the additional HTTP request to the second task while the second task is still at the second priority level.

EI 4: The cloud provider system of EI 1, wherein the application execution service is configured to promote one or more tasks of the set of tasks that are at the second priority level to the first priority level based at least in part on a ratio of (i) HTTP requests routed to second-priority-level tasks of the set of tasks to (ii) HTTP requests routed to first-priority-level tasks of the set of tasks being greater than a threshold value.

EI 5: A computer-implemented method comprising: receiving a request to execute a software application configured to handle a plurality of requests; executing a set of tasks to be used to implement the software application, wherein the set of tasks includes at least a first task and a second task that are each configured to handle a subset of the plurality of requests directed to the software application, and wherein the task execution request indicates that each of the set of tasks is to be allocated a first amount of computing resources; placing each task of the set of tasks in a standby mode in which a resource allocation associated with the task is reduced to a second amount of computing resources that is less than the first amount of computing resources; in response to a request routed to the first task, placing the first task in an active mode in which the resource allocation associated with the first task is returned to the first amount of computing resources; based at least in part on the first task associated with the software application being at a first priority level and the second task associated with the software application being at a second priority level lower than the first priority level, routing a set of requests directed to the software application to the first task, such that the second task continues to stay in the standby mode while the first task is processing the set of requests; based at least in part on the first task not having enough capacity to handle an additional request directed to the software application, routing the additional request to the second task; and in response to the additional request routed to the second task, placing the second task in an active mode in which the resource allocation associated with the second task is returned to the first amount of computing resources.

EI 6: The computer-implemented method of EI 5, further comprising, prior to routing the additional request to the second task, routing the additional request to the first task and receiving an indication that the additional request was not successfully processed by the first task.

EI 7: The computer-implemented method of EI 5, further comprising, prior to routing the additional request to the second task, promoting the second task to the first priority level.

EI 8: The computer-implemented method of EI 5, further comprising routing the additional request to the second task while the second task is still at the second priority level.

EI 9: The computer-implemented method of EI 5, further comprising promoting one or more tasks of the set of tasks that are at the second priority level to the first priority level based at least in part on a ratio of (i) requests routed to second-priority-level tasks of the set of tasks to (ii) requests routed to first-priority-level tasks of the set of tasks being greater than a threshold value.

EI 10: The computer-implemented method of EI 5, wherein the software application is associated with a uniform resource locator (URL), and prior to being routed to the first task, the set of requests is received via the URL.

EI 11: The computer-implemented method of EI 5, further comprising, prior to placing the set of tasks in the standby mode in which the resource allocation associated with each of the set of tasks is reduced to the second amount of computing resources that is less than the first amount of computing resources, associating the software application with the first amount of computing resources in response a request received from a user computing device.

EI 12: The computer-implemented method of EI 5, wherein the set of tasks is executed on one of a virtual machine instance, a bare-metal instance, a microVM, a physical machine, a container, a node, an offload card, an IoT device, or on-premises compute capacity.

EI 13: A non-transitory computer readable medium storing instructions that, when executed by a computing system within a cloud provider network, cause the computing system to perform operations comprising: receiving a request to execute a software application configured to handle a plurality of requests; executing a set of tasks to be used to implement the software application, wherein the set of tasks includes at least a first task and a second task that are each configured to handle a subset of the plurality of requests directed to the software application, and wherein the task execution request indicates that each of the set of tasks is to be allocated a first amount of computing resources; placing each task of the set of tasks in a standby mode in which a resource allocation associated with the task is reduced to a second amount of computing resources that is less than the first amount of computing resources; in response to a request routed to the first task, placing the first task in an active mode in which the resource allocation associated with the first task is returned to the first amount of computing resources; based at least in part on the first task associated with the software application being at a first priority level and the second task associated with the software application being at a second priority level lower than the first priority level, routing a set of requests directed to the software application to the first task, such that the second task continues to stay in the standby mode while the first task is processing the set of requests; based at least in part on the first task not having enough capacity to handle an additional request directed to the software application, routing the additional request to the second task; and in response to the additional request routed to the second task, placing the second task in an active mode in which the resource allocation associated with the second task is returned to the first amount of computing resources.

EI 14: The non-transitory computer readable medium of EI 13, storing further instructions that, when executed by the computing system, cause the computing system to perform operations comprising, prior to routing the additional request to the second task, routing the additional request to the first task and receiving an indication that the additional request was not successfully processed by the first task.

EI 15: The non-transitory computer readable medium of EI 13, storing further instructions that, when executed by the computing system, cause the computing system to perform operations comprising, prior to routing the additional request to the second task, promoting the second task to the first priority level.

EI 16: The non-transitory computer readable medium of EI 13, storing further instructions that, when executed by the computing system, cause the computing system to perform operations comprising routing the additional request to the second task while the second task is still at the second priority level.

EI 17: The non-transitory computer readable medium of EI 13, storing further instructions that, when executed by the computing system, cause the computing system to perform operations comprising promoting one or more tasks of the set of tasks that are at the second priority level to the first priority level based at least in part on a ratio of (i) requests routed to second-priority-level tasks of the set of tasks to (ii) requests routed to first-priority-level tasks of the set of tasks being greater than a threshold value.

EI 18: The non-transitory computer readable medium of EI 13, wherein the software application is associated with a uniform resource locator (URL), and prior to being routed to the first task, the set of requests is received via the URL.

EI 19: The non-transitory computer readable medium of EI 13, storing further instructions that, when executed by the computing system, cause the computing system to perform operations comprising, prior to placing the set of tasks in the standby mode in which the resource allocation associated with each of the set of tasks is reduced to the second amount of computing resources that is less than the first amount of computing resources, associating the software application with the first amount of computing resources in response a request received from a user computing device.

EI 20: The non-transitory computer readable medium of EI 13, wherein the set of tasks is executed on one of a virtual machine instance, a bare-metal instance, a microVM, a physical machine, a container, a node, an offload card, an IoT device, or on-premises compute capacity.

EI 21: A cloud provider system comprising: a serverless container management service configured to acquire compute capacity and execute a task using the acquired compute capacity in response to a request to execute the task; and an application execution service in networked communication with the serverless container management service, wherein the application execution service is configured to at least: receive a request to deploy a Web application configured to handle a plurality of HTTP requests; transmit, to the serverless container management service, a task execution request to execute a set of tasks to be used to implement the Web application, wherein the set of tasks includes at least a first task and a second task that are each configured to handle a subset of the plurality of HTTP requests directed to the Web application, and wherein the task execution request indicates that each of the set of tasks is to be allocated a first amount of computing resources; and based at least in part on the first task associated with the Web application being at a first priority level and the second task associated with the Web application being at a second priority level lower than the first priority level, route a set of HTTP requests directed to the Web application to the first task, and wherein the serverless container management service is further configured to at least: determine that the first task has finished handling the set of HTTP requests routed to the first task and no other HTTP requests are waiting to be handled by the first task; and cause the first task to be transitioned from (i) an active mode in which the first amount of computing resources is allocated to the first task to (ii) a standby mode in which a second amount of computing resources less than the first amount of computing resources is allocated to the first task.

EI 22: The cloud provider system of EI 21, wherein the application execution service is configured to, subsequent to determining that a new HTTP request previously routed to the first task was not successfully processed by the first task, route the new HTTP request to the second task.

EI 23: The cloud provider system of EI 21, wherein the serverless container management service is configured to allocate at least a portion of a difference between the first amount of computing resources and the second amount of computing resources for executing another task configured to implement a software application different from the Web application.

EI 24: The cloud provider system of EI 21, wherein the serverless container management service is configured to, subsequent to transitioning the first task from the active mode to the standby mode, transition the first task from the standby mode to the active mode and begin processing a new HTTP request, wherein a first latency associated with transitioning the first task to the active mode and beginning to process the new HTTP request is lower than a second latency associated with launching a new task and causing the new task to begin processing the new HTTP request.

EI 25: A computer-implemented method comprising: receiving a request to execute a software application configured to process a plurality of requests; executing a set of tasks associated with the software application, wherein the set of tasks includes at least a first task and a second task that are each configured to handle a subset of the plurality of requests directed to the software application and associated with a first amount of computing resources; based at least in part on the first task associated with the software application being at a first priority level and the second task associated with the software application being at a second priority level lower than the first priority level, routing a set of requests directed to the software application to the first task; determining that the first task has finished processing the set of requests and no other requests are waiting to be processed by the first task; and transitioning the first task from (i) an active mode in which the first amount of computing resources is allocated to the first task to (ii) a standby mode in which a second amount of computing resources less than the first amount of computing resources is allocated to the first task.

EI 26: The computer-implemented method of EI 25, further comprising, subsequent to determining that a new request previously routed to the first task was not successfully processed by the first task, routing the first request to the second task.

EI 27: The computer-implemented method of EI 25, further comprising allocating at least a portion of a difference between the first amount of computing resources and the second amount of computing resources for executing another task configured to implement a software application different from the Web application.

EI 28: The computer-implemented method of EI 25, further comprising, subsequent to transitioning the first task from the active mode to the standby mode, transitioning the first task from the standby mode to the active mode and beginning to process a new request, wherein a first latency associated with transitioning the first task to the active mode and beginning to process the new request is lower than a second latency associated with launching a new task and causing the new task to begin processing the new request.

EI 29: The computer-implemented method of EI 25, further comprising, prior to determining that no other requests are waiting to be processed by the first task, demoting the first task from the first priority level to the second priority level based at least in part on a utilization level associated with the first task being lower than a threshold level.

EI 30: The computer-implemented method of EI 25, wherein the software application is associated with a uniform resource locator (URL) and prior to being routed to the first task, the set of requests is received via the URL.

EI 31: The computer-implemented method of EI 25, further comprising associating the software application with the first amount of computing resources in response a request received from a user computing device.

EI 32: The computer-implemented method of EI 25, wherein the set of tasks is executed on one of a virtual machine instance, a bare-metal instance, a microVM, a physical machine, a container, a node, an offload card, an IoT device, or on-premises compute capacity.

EI 33: A non-transitory computer readable medium storing instructions that, when executed by a computing system within a cloud provider network, cause the computing system to perform operations comprising: receiving a request to inspect a first container image, wherein the request indicates a first set of parameters usable to execute the first container image, and wherein the first container image contains a plurality of files usable during the execution of the first container image; determining a second set of parameters usable to execute an inspector container image, wherein the inspector container image is configured to monitor access to the plurality of files in the first container image during the execution of the first container image; executing the inspector container image using the second set of parameters; identifying (i) at least one unused file of the plurality of files in the first container image that was unused during the execution of the inspector container image, and (ii) a subset of remaining files of the plurality of files in the first container image that were used during the execution of the inspector container image; and outputting a second container image that contains the subset of remaining files but not the at least one unused file.

EI 34: The non-transitory computer readable medium of EI 33, storing further instructions that, when executed by the computing system, cause the computing system to perform operations comprising, subsequent to determining that a new request previously routed to the first task was not successfully processed by the first task, routing the first request to the second task.

EI 35: The non-transitory computer readable medium of EI 33, storing further instructions that, when executed by the computing system, cause the computing system to perform operations comprising allocating at least a portion of a difference between the first amount of computing resources and the second amount of computing resources for executing another task configured to implement a software application different from the Web application.

EI 36: The non-transitory computer readable medium of EI 33, storing further instructions that, when executed by the computing system, cause the computing system to perform operations comprising, subsequent to transitioning the first task from the active mode to the standby mode, transitioning the first task from the standby mode to the active mode and beginning to process a new request, wherein a first latency associated with transitioning the first task to the active mode and beginning to process the new request is lower than a second latency associated with launching a new task and causing the new task to begin processing the new request.

EI 37: The non-transitory computer readable medium of EI 33, storing further instructions that, when executed by the computing system, cause the computing system to perform operations comprising, prior to determining that no other requests are waiting to be processed by the first task, demoting the first task from the first priority level to the second priority level based at least in part on a utilization level associated with the first task being lower than a threshold level.

EI 38: The non-transitory computer readable medium of EI 33, wherein the software application is associated with a uniform resource locator (URL) and prior to being routed to the first task, the set of requests is received via the URL.

EI 39: The non-transitory computer readable medium of EI 33, storing further instructions that, when executed by the computing system, cause the computing system to perform operations comprising associating the software application with the first amount of computing resources in response a request received from a user computing device.

EI 40: The non-transitory computer readable medium of EI 33, wherein the set of tasks is executed on one of a virtual machine instance, a bare-metal instance, a microVM, a physical machine, a container, a node, an offload card, an IoT device, or on-premises compute capacity.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A cloud provider system comprising:
   a serverless container management service configured to acquire compute capacity and execute a task using the acquired compute capacity in response to a request to execute the task; and
   an application execution service in networked communication with the serverless container management service,
   wherein the application execution service is configured to at least:
      receive a request to deploy a Web application configured to handle a plurality of HTTP requests; and
      transmit, to the serverless container management service, a task execution request to execute a set of tasks to be used to implement the Web application, wherein the set of tasks includes at least a first task and a second task that are each configured to handle a subset of the plurality of HTTP requests directed to the Web application, and wherein the task execution request indicates that each of the set of tasks is to be allocated a first amount of computing resources, wherein the serverless container management service is further configured to at least:

in response to the task execution request from the application execution service, cause the set of tasks to be executed, wherein each task of the set of tasks is placed in a standby mode in which a second amount of computing resources that is less than the first amount of computing resources is allocated to said each task of the set of tasks; and in response to an HTTP request routed to the first task, cause the HTTP request to be executed by the first task, wherein the application execution service is further configured to at least:

based at least in part on the first task associated with the Web application being at a first priority level and the second task associated with the Web application being at a second priority level lower than the first priority level, route a set of HTTP requests directed to the Web application to the first task, such that the second task continues to stay in the standby mode with the second amount of computing resources allocated thereto while the first task is processing the set of HTTP requests with the first amount of computing resources allocated thereto that is greater than the second amount of computing resources; and based at least in part on the first task not having enough capacity to handle an additional HTTP request directed to the Web application, route the additional HTTP request to the second task, and wherein the serverless container management service is further configured to at least:

in response to the additional HTTP request routed to the second task, cause the additional request to be processed by the second task with a reduced amount of computing resources that is less than the first amount; and based on a utilization level associated with the second task, cause an increased amount of computing resources that is greater than the reduced amount to be allocated to the second task.

2. The cloud provider system of claim 1, wherein the application execution service is configured to, prior to routing the additional HTTP request to the second task, promote the second task to the first priority level.

3. The cloud provider system of claim 1, wherein the application execution service is configured to route the additional HTTP request to the second task while the second task is still at the second priority level.

4. The cloud provider system of claim 1, wherein the application execution service is configured to promote one or more tasks of the set of tasks that are at the second priority level to the first priority level based at least in part on a ratio of (i) HTTP requests routed to second-priority-level tasks of the set of tasks to (ii) HTTP requests routed to first-priority-level tasks of the set of tasks being greater than a threshold value.

5. A computer-implemented method comprising:

receiving a request to execute a software application configured to handle a plurality of requests;

executing a set of tasks to be used to implement the software application, wherein the set of tasks includes at least a first task and a second task that are each configured to handle a subset of the plurality of requests directed to the software application, and wherein the task execution request indicates that each of the set of tasks is to be allocated a first amount of computing resources;

placing each task of the set of tasks in a standby mode in which a second amount of computing resources that is less than the first amount of computing resources is allocated to said each task of the set of tasks;

in response to a request routed to the first task, causing the request to be executed by the first task;

based at least in part on the first task associated with the software application being at a first priority level and the second task associated with the software application being at a second priority level lower than the first priority level, routing a set of requests directed to the software application to the first task, such that the second task continues to stay in the standby mode with the second amount of computing resources allocated thereto while the first task is processing the set of requests with the first amount of computing resources allocated thereto that is greater than the second amount of computing resources;

based at least in part on the first task not having enough capacity to handle an additional request directed to the software application, routing the additional request to the second task;

in response to the additional request routed to the second task, causing the additional request to be processed by the second task with a reduced amount of computing resources that is less than the first amount; and based on a utilization level associated with the second task, causing an increased amount of computing resources that is greater than the reduced amount to be allocated to the second task.

6. The computer-implemented method of claim 5, further comprising, prior to routing the additional request to the second task, routing the additional request to the first task and receiving an indication that the additional request was not successfully processed by the first task.

7. The computer-implemented method of claim 5, further comprising, prior to routing the additional request to the second task, promoting the second task to the first priority level.

8. The computer-implemented method of claim 5, further comprising routing the additional request to the second task while the second task is still at the second priority level.

9. The computer-implemented method of claim 5, further comprising promoting one or more tasks of the set of tasks that are at the second priority level to the first priority level based at least in part on a ratio of (i) requests routed to second-priority-level tasks of the set of tasks to (ii) requests routed to first-priority-level tasks of the set of tasks being greater than a threshold value.

10. The computer-implemented method of claim 5, wherein the software application is associated with a uniform resource locator (URL), and prior to being routed to the first task, the set of requests is received via the URL.

11. The computer-implemented method of claim 5, further comprising, prior to placing the set of tasks in the standby mode, associating the software application with the first amount of computing resources in response a request received from a user computing device.

12. The computer-implemented method of claim 5, wherein the set of tasks is executed on one of a virtual machine instance, a bare-metal instance, a microVM, a physical machine, a container, a node, an offload card, an IoT device, or on-premises compute capacity.

13. A non-transitory computer-readable medium storing instructions that, when executed by a computing system within a cloud provider network, cause the computing system to perform operations comprising:
   receiving a request to execute a software application configured to handle a plurality of requests;
   executing a set of tasks to be used to implement the software application, wherein the set of tasks includes at least a first task and a second task that are each configured to handle a subset of the plurality of requests directed to the software application, and wherein the task execution request indicates that each of the set of tasks is to be allocated a first amount of computing resources;
   placing each task of the set of tasks in a standby mode in which a second amount of computing resources that is less than the first amount of computing resources is allocated to said each task of the set of tasks;
   in response to a request routed to the first task, causing the request to be executed by the first task;
   based at least in part on the first task associated with the software application being at a first priority level and the second task associated with the software application being at a second priority level lower than the first priority level, routing a set of requests directed to the software application to the first task, such that the second task continues to stay in the standby mode with the second amount of computing resources allocated thereto while the first task is processing the set of requests with the first amount of computing resources allocated thereto that is greater than the second amount of computing resources;
   based at least in part on the first task not having enough capacity to handle an additional request directed to the software application, routing the additional request to the second task;
   in response to the additional request routed to the second task, causing the additional request to be processed by the second task with a reduced amount of computing resources that is less than the first amount; and
   based on a utilization level associated with the second task, causing an increased amount of computing resources that is greater than the reduced amount to be allocated to the second task.

14. The non-transitory computer-readable medium of claim 13, storing further instructions that, when executed by the computing system, cause the computing system to perform operations comprising, prior to routing the additional request to the second task, routing the additional request to the first task and receiving an indication that the additional request was not successfully processed by the first task.

15. The non-transitory computer-readable medium of claim 13, storing further instructions that, when executed by the computing system, cause the computing system to perform operations comprising, prior to routing the additional request to the second task, promoting the second task to the first priority level.

16. The non-transitory computer-readable medium of claim 13, storing further instructions that, when executed by the computing system, cause the computing system to perform operations comprising routing the additional request to the second task while the second task is still at the second priority level.

17. The non-transitory computer-readable medium of claim 13, storing further instructions that, when executed by the computing system, cause the computing system to perform operations comprising promoting one or more tasks of the set of tasks that are at the second priority level to the first priority level based at least in part on a ratio of (i) requests routed to second-priority-level tasks of the set of tasks to (ii) requests routed to first-priority-level tasks of the set of tasks being greater than a threshold value.

18. The non-transitory computer-readable medium of claim 13, wherein the software application is associated with a uniform resource locator (URL), and prior to being routed to the first task, the set of requests is received via the URL.

19. The non-transitory computer-readable medium of claim 13, storing further instructions that, when executed by the computing system, cause the computing system to perform operations comprising, prior to placing the set of tasks in the standby mode, associating the software application with the first amount of computing resources in response a request received from a user computing device.

20. The non-transitory computer-readable medium of claim 13, wherein the set of tasks is executed on one of a virtual machine instance, a bare-metal instance, a microVM, a physical machine, a container, a node, an offload card, an IoT device, or on-premises compute capacity.

* * * * *

UNITED STATES PATENT AND TRADEMARK OFFICE
CERTIFICATE OF CORRECTION

| | | |
|---|---|---|
| PATENT NO. | : 11,989,586 B1 | Page 1 of 1 |
| APPLICATION NO. | : 17/305143 | |
| DATED | : May 21, 2024 | |
| INVENTOR(S) | : Archana Srikanta et al. | |

It is certified that error appears in the above-identified patent and that said Letters Patent is hereby corrected as shown below:

In the Drawings

Sheet 2 of 7, (reference numeral 206) (Fig. 2), Line 1, and on the title page, the illustrative print figure, delete "INTIALIZE" and insert -- INITIALIZE --.

Sheet 2 of 7, (reference numeral 212) (Fig. 2), Line 2, and on the title page, the illustrative print figure, delete "REOSURCE" and insert -- RESOURCE --.

Signed and Sealed this
Tenth Day of September, 2024

Katherine Kelly Vidal
*Director of the United States Patent and Trademark Office*